B. C. BRADLEY.
Plow.
No. 164,134.
Patented June 8, 1875.
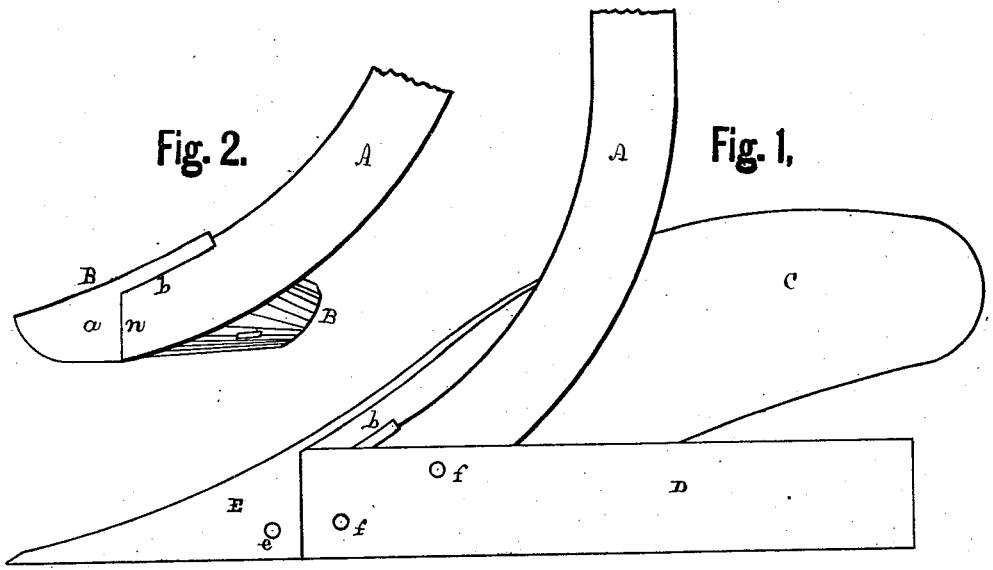
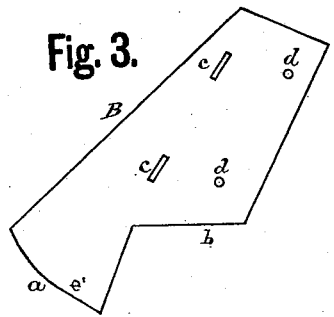
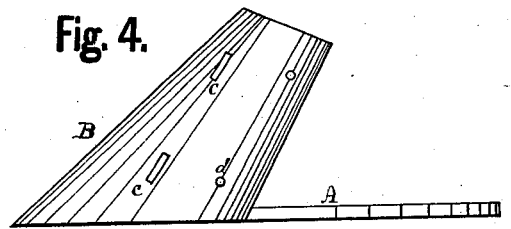
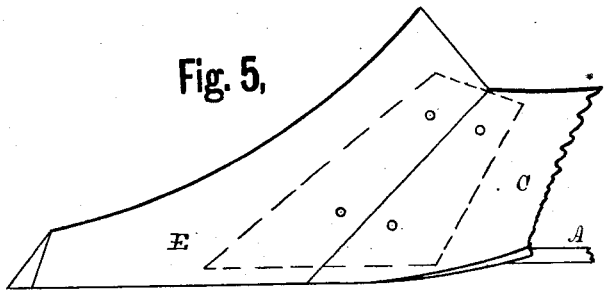
Witnesses:
E. A. West
O. W. Bond
Byron C. Bradley
Inventor.

UNITED STATES PATENT OFFICE.

BYRON C. BRADLEY, OF CHICAGO, ILLINOIS.

IMPROVEMENT IN PLOWS.

Specification forming part of Letters Patent No. 164,134, dated June 8, 1875; application filed March 19, 1875.

*To all whom it may concern:*

Be it known that I, BYRON C. BRADLEY, of the city of Chicago, in the county of Cook and State of Illinois, have invented new and useful Improvements in Plows, of which the following is a full description, reference being had to the accompanying drawings, in which—

Figure 1 is a side elevation; Fig. 2, a side elevation of the parts shown; Fig. 3, a plan view of the part B before it is formed and welded to the standard; Fig. 4, a top view of the parts shown; Fig. 5, a top view of the share and part of the mold-board, showing in dotted lines the position of the part B.

To improve the construction of plows is the object of this invention; and it consists, chiefly, in providing a foundation, consisting of a standard and another piece welded thereto, to which foundation the mold-board, share, and land-side are secured by means of bolts.

In the drawings, A represents the standard, and B the supporting-piece, made from a blank, the form of which is shown in Fig. 3. The part $a$ is bent over, as shown in Fig. 2. This piece B is to be welded to the standard along the line $b$. The parts A B are both to be brought to their desired form by means of suitable dies before they are welded together; and when B has been welded to A, that portion of the standard A and the part $a$ present a smooth surface along the line $n$, where the two parts come together. B is provided with two slots, $c\ c$, through which pass the bolts which secure the slip-share to B, thus providing for any slight variations which may occur. These two parts A and B, when welded together, as described, form the foundation, to which the remaining parts of the plow are secured. C is the mold-board; D, the land-side, and E a slip-share or point.

The mold-board is secured to the part B by means of two bolts passing through the holes $d\ d$, and to the standard in the usual manner. The land-side is bolted to the standard by bolts $f\ f$. The slip-share or point is secured to the part B by means of a bolt, $e$, which passes through the part $a$ at $e'$, and by means of one or more bolts passing through the slots $c$.

In manufacturing it will be desirable to form the mold-board and share with dies; then, using the foundation A B, made as described, the other parts can be secured thereto without fitting them, as any one of a number of shares or points will fit equally well. Heretofore more or less fitting was usually required for each of these parts. When the slip-share is worn out it can be replaced with great ease, the slotted holes $c$ allowing for any slight variations of the bolt-holes. In large plows one or more braces may be used, running from the land-side to the part B; but in plows of medium size this will not be required.

It is evident that a long bar-share can be attached to the foundation A B, made as described, with the same ease as a slip-share, and in substantially the same way by means of bolts.

What I claim as new is as follows:

The standard A and the parts B, formed or rigidly secured together, and constructed as described, forming a foundation for, and in combination with, the mold-board C and land-side D, and points E, all as and for the purpose herein described.

BYRON C. BRADLEY.

Witnesses:
 E. A. WEST,
 O. W. BOND.